United States Patent
Ziolo et al.

(10) Patent No.: US 6,752,420 B2
(45) Date of Patent: Jun. 22, 2004

(54) AIRBAG MODULE USING ACTIVE VENTING MEMBRANE

(75) Inventors: Melissa S. Ziolo, Waterford, MI (US); Timothy A. DePottey, Flint, MI (US)

(73) Assignee: Autoliv ASP, Inc., Ogden, UT (US)

( * ) Notice: Subject to any disclaimer, the term of this patent is extended or adjusted under 35 U.S.C. 154(b) by 29 days.

(21) Appl. No.: 10/210,158

(22) Filed: Aug. 1, 2002

(65) Prior Publication Data

US 2004/0021307 A1 Feb. 5, 2004

(51) Int. Cl.[7] .................. B60R 21/28; B60R 21/26; B60R 21/32
(52) U.S. Cl. .................. 280/739; 280/742; 280/736
(58) Field of Search .................. 280/736, 739, 280/740, 742

(56) References Cited

U.S. PATENT DOCUMENTS

| | | | |
|---|---|---|---|
| 3,573,885 A | | 4/1971 | Brawn .................. 280/150 |
| 3,884,499 A | * | 5/1975 | Oka et al. .................. 280/735 |
| 5,366,242 A | | 11/1994 | Faigle et al. .................. 280/736 |
| 5,645,297 A | * | 7/1997 | Rose et al. .................. 280/739 |
| 5,664,802 A | * | 9/1997 | Harris et al. .................. 280/736 |
| 5,709,405 A | | 1/1998 | Saderholm et al. .................. 280/736 |
| 5,743,558 A | | 4/1998 | Seymour .................. 280/739 |
| 5,851,029 A | * | 12/1998 | Klinger et al. .................. 280/736 |
| 5,853,192 A | * | 12/1998 | Sikorski et al. .................. 280/739 |
| 5,899,494 A | | 5/1999 | Lane, Jr. .................. 280/739 |
| 5,918,901 A | | 7/1999 | Johnson et al. .................. 280/739 |
| 5,997,033 A | | 12/1999 | Gray et al. .................. 280/735 |
| 6,017,056 A | | 1/2000 | Lee .................. 280/739 |
| 6,106,009 A | * | 8/2000 | Katsuda et al. .................. 280/741 |
| 6,158,770 A | | 12/2000 | Ryan et al. .................. 280/736 |
| 6,161,866 A | | 12/2000 | Ryan et al. .................. 280/736 |
| 6,213,502 B1 | | 4/2001 | Ryan et al. .................. 280/736 |
| 6,241,279 B1 | | 6/2001 | Ochiai .................. 280/735 |
| 6,517,108 B1 | * | 2/2003 | Vinton et al. .................. 280/739 |
| 6,540,257 B2 | * | 4/2003 | Magoteaux .................. 280/739 |

FOREIGN PATENT DOCUMENTS

| | | | |
|---|---|---|---|
| DE | 1962890 | 7/1970 | |
| GB | 2306409 | 5/1997 | .......... B60R/21/28 |

* cited by examiner

*Primary Examiner*—Ruth Ilan
(74) *Attorney, Agent, or Firm*—Sally J. Brown (57) ABSTRACT

An airbag module capable of providing varying degrees of inflation to an airbag is disclosed. The airbag module has a housing with an interior and an exterior. A number of venting holes are located in the walls of the housing to allow gas to pass between the interior and exterior of the housing. These venting holes are sealed with a thin membrane to which an initiator is attached. The initiator is designed to create a hole in the membrane according to an input from sensors positioned within the automobile. Once the hole is created in the membrane, the gas pressure inside the housing forces the entire membrane to open and allows gas to flow out of the venting holes. The amount of gas emitted from the venting holes thus reduces the inflation of the airbag.

36 Claims, 6 Drawing Sheets

AIRBAG MODULE USING ACTIVE VENTING MEMBRANE

BACKGROUND OF THE INVENTION

1. Field of the Invention

The present invention relates to controlling the characteristics of automobile airbag module energy management. More specifically the present invention relates to an apparatus for controlling energy management characteristics of an automobile airbag module through selectively opening venting holes in the airbag housing.

2. Technical Background

Inflatable airbags are well accepted in their use in motor vehicles and have been credited with preventing numerous deaths and accidents. Some statistics estimate that frontal airbags reduce fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Thus, airbag use presents clear benefits.

Despite the clear benefits of current airbags, recent debate concerning the safety of airbags has occurred. Most airbags currently in use have a generically sized airbag coupled to a generic inflator. When a vehicle experiences a rapid deceleration, the inflator will inflate the airbag with a single set of deployment characteristics, regardless of the occupant's physical characteristics. Studies have established that a single set of deployment characteristics may not be effective in restraining all occupants. For example, the deployment force of an airbag required to attenuate the motion of a large man may cause serious injury or death when that force is applied to a child or small woman.

Furthermore, the success of airbags has created the misconception that airbags may be used to replace primary restraining systems, such as seatbelts. Disregarding primary restraining systems will result in the occupant applying a larger force on the airbag than would be present if the occupant had been using a seat belt.

In order to overcome this design dilemma, intelligent airbag deployment systems have begun to appear in various vehicles. Intelligent airbag deployment systems are capable of measuring the physical characteristics and environment surrounding various passengers. Measurements such as weight, position, and presence of a passenger can be determined. Using the obtained information the airbag may be deployed and controlled accordingly. Furthermore, some systems are capable of determining if a passenger is actually in a seat and not wearing a seatbelt, or if the seat is simply empty. Yet other systems are capable of detecting the presence of a child safety seat and will not deploy at all.

However, this new approach in controlling airbag inflation brings the problem of having a single airbag that is capable of multiple deployment characteristics. Generally, an airbag module is primarily comprised of an airbag and an inflator. The inflator comprises a gas generant and is fluidly coupled to the airbag. When an initiation signal is received from a sensor in the automobile, the inflator ejects a gas into the airbag. In order to control the inflation characteristics of the airbag, the flow of gas into the airbag must be controlled.

One method of controlling the flow of gas into the airbag is to provide a controlling system situated between the inflator and the airbag. Such a system allows an inflator having generic deployment characteristics to be used. The inflator may eject a flow of gas where measured amounts of the gas is diverted away from the airbag before of after inflation of the airbag. Thus, a single inflator may be designed for the largest inflation force required and inflation of the airbag be controlled by a regulating system.

One promising system for controlling the amount energy imparted by an airbag onto a passenger is through the use of venting mechanisms. Venting mechanisms may be placed within the walls of the structure that conveys the gas from the inflator to the airbag, such as a housing. Typically, a housing is a structure that maintains the inflator and the airbag.

A venting mechanism operates by selectively venting an amount of gas away from or out of the airbag. By discharging various increments of gas away from the airbag, the inflation characteristics of the airbag and the duration of inflation can be controlled. Unfortunately, current processes and apparatuses for venting gas out of the housing and away from an airbag are often unsatisfactory. The current processes lack an efficient and controllable system for venting a gas.

Some airbag modules control the venting process through complex gas flow systems. These systems often have expensive solenoid controlled valves to measurably release varying amounts of gas. Such systems can require a large amount of design and can be unreliable. Other airbag modules implement piezoelectric crystals in place of solenoids to selectively open the venting valves in response to an electrical current. However, piezoelectric crystals are expensive and can require a large input signal to open a valve. Furthermore, these complex systems are often wasteful for a single operation airbag inflator.

Recognizing the possible benefits of a single operation airbag module, other venting systems have sought to deflagrate various shapes in the sides of the housing. To accomplish this, a channel or other mounting structure is typically molded or cut into the side of the housing. A deflagration device is then placed in the channel. Often, the channel defines the shape of a venting hole that will be deflagrated into the wall of the housing. When the deflagration strip ignites, the outline of a venting hole is created having a shape that is the same as the shaped of the deflagration strip. Thus, the high internal air pressure of the inflation gas created during deployment forces a vent to open in the housing.

While the above described system does provide advantages over complex mechanical systems, it still has several significant disadvantages. For example, deflagrating a shape into the side of a housing may not create a precisely uniform shape to vent a measured amount of gas. Further, a large deflagration will increase the cost of the airbag module. Also, the heat generated by a deflagration strip may have some adverse effects on the airbag itself. Creating channels in a housing and adding a deflagration strip can increase the manufacturing time required to make a module. Finally, attempts to deflagrate a hole through the wall of the housing may not always be successful, preventing the venting system from operating correctly.

In order to correct the shortcomings of the above described systems, what is needed is a low cost system to vent an inflation gas away from an airbag. What is also needed is a system that is small and inexpensive. Furthermore, a system is needed that uses minimal energy to vent a maximum amount of gas. Another need exists for an inflation gas venting system that can incrementally vent different amounts of gas. What is also needed is a system that insures a precisely sized venting hole for highly calibrated gas emission. What is further needed is a system that may be manufactured quickly with minimal custom made parts.

There is also a need in the art for an airbag inflation system that controllably vents gas out of an inflated airbag. There is a further need in the art for an inflation system that controllably decelerates an occupant's impact with an airbag. A need also exists for a system that employs an occupant's impact energy in decelerating the occupant. Such a system and method is disclosed and claimed herein.

BRIEF SUMMARY OF THE INVENTION

The apparatus and method of the present invention have been developed in response to the present state-of-the-art, and, in particular, in response to need in the art. Thus, it is an overall objective of the present invention to provide a low cost and highly controllable venting system for an airbag module.

To accomplish this objective, a housing having a plurality of walls is provided. The walls define an interior and an exterior of the housing. At least one venting hole is present in a wall of the housing. The venting hole is a hole that provides fluid communication between the interior and exterior of the housing. The venting hole is sealed by a generally thin membrane, preventing fluid communication between the interior and exterior of the housing.

An initiator is located at a position relative to the membrane, such that upon initiation the initiator produces a hole in the membrane. The initiator may be directly attached to the membrane or may be spaced at a distance from the membrane. Once a hole is produced in the membrane, the internal pressure of the gas in the housing or the load placed on the airbag by the occupant forces the membrane to open. Thus, the interior and the exterior of the housing come into fluid communication again.

The membrane may have several embodiments. The membrane may include various materials, such as foils or plastics. Additionally, the various thicknesses of these materials may be used to the membranes. Similarly, the venting holes in the housing may also be various shapes, sizes, and numbers. Some venting holes may be generally circular, while others may be elongated openings. Other housings may include multiple venting holes on multiple housing walls. The additional venting holes may have individual membranes sealing them, or alternatively, a single membrane may cover multiple venting holes.

Several methods of opening the venting holes may also be incorporated in the airbag module. For example, the initiator may create only a small propagation hole in the membrane. The propagation hole provides a location from which the pressure within the housing may force open the remaining membrane. Thus, a relatively small hole in the membrane allows the pressure within the housing to fully open the entire venting hole. Other initiators may create larger propagation holes, such as a slit or "X" shaped cut in the membrane. Alternatively, the initiator may be configured to destructively open the entire membrane at a single instant.

Various types of initiators may be incorporated in the airbag module. The initiators may be a deflagration, electrochemical, or pyrotechnic device. These initiators may further be controlled by an impact management system. The impact management system may receive various signal inputs from sensors positioned throughout an automobile. The sensors may determine the degree of inflation and deflation required for the airbag and open a selective number of venting holes accordingly. Thus, the inflation and deflation characteristics of an airbag may be tailored to the physical characteristics and environment of individual passengers.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting in scope. The invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–5, where like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the figures, is not intended to limit the scope of the invention as claimed, but is merely representative of presently preferred embodiments of the invention.

Figure 1:
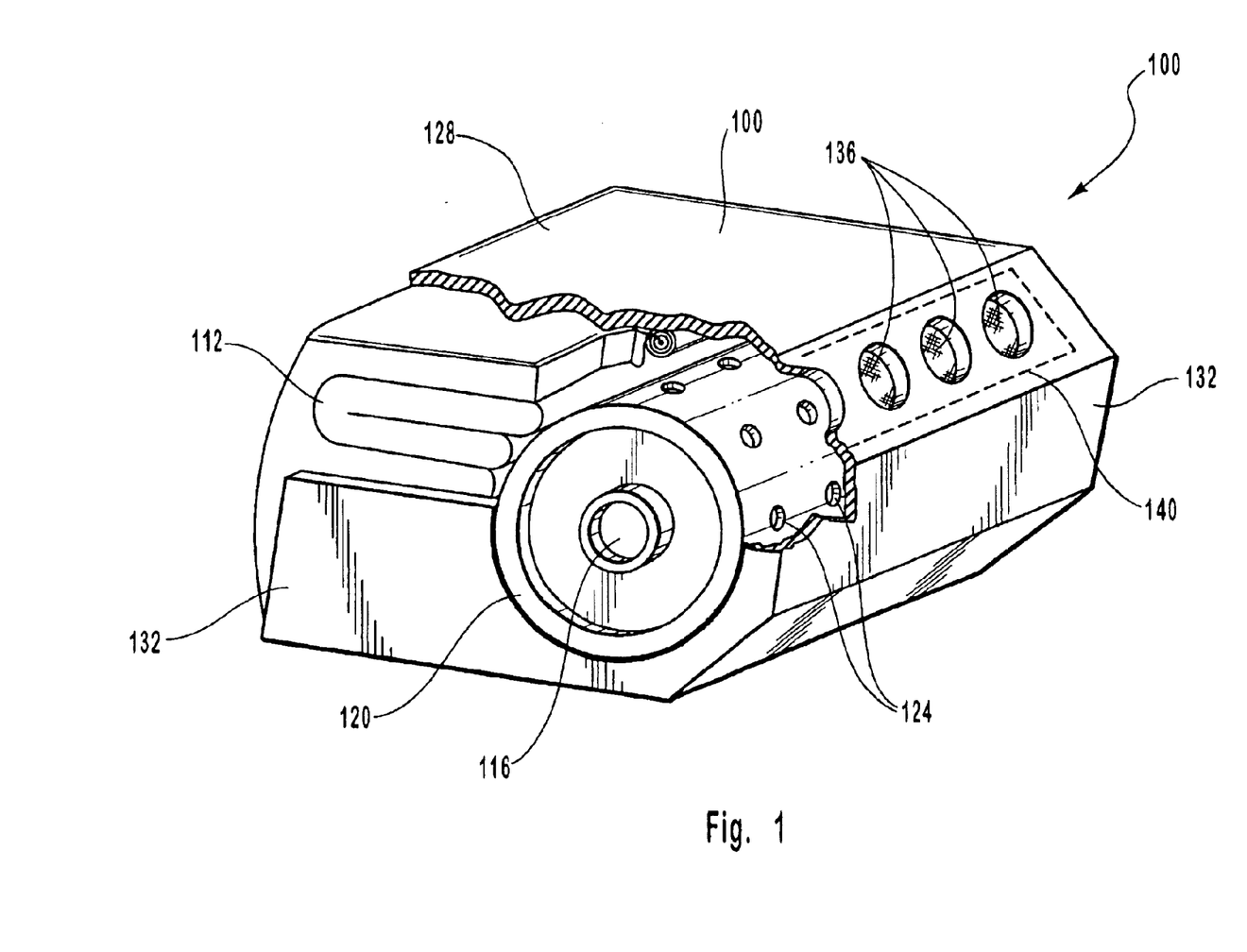
FIG. 1 is a partially cutaway perspective view of an airbag module.

Referring now to FIG. 1, an airbag module 100 for restraining an automobile occupant's motion is illustrated. The airbag module 100 may be any type of airbag module 100 positioned in various locations throughout an automobile. Such applications may include airbag modules 100 located in the steering wheel, dashboard, doors, headliners, and external bumper airbags. These varying types of airbag modules 100 may have different configurations depending upon the individual applications. The airbag module 100 illustrated in FIG. 1 is a dashboard mounted airbag module.

The airbag module 100 has an airbag 112 in a folded and undeployed state. The airbag 112 may have varying shapes and sizes depending upon the varying automobile applications. The airbag 112 is positioned in the airbag module 100 to be in fluid communication with an inflator 116.

The inflator 116, as illustrated in FIG. 1, is situated within a diffuser 120 and the airbag 112, the inflator 116, and the diffuser 120 are positioned within a housing 128. The housing 128 maintains the above described airbag module 100 components. The housing 128 may have any number of shapes and is not limited to the shape illustrated in the figures.

The housing 128 functions to direct gas flow from the inflator 116 and the diffuser 120 into the airbag 112. In order to direct a gas flow throughout the housing 128, the housing 128 partially contains the inflation gas. The gas containment characteristics of the housing 128 are achieved through a series of walls 132 that enclose the elements of the airbag module 100. The orientation and size of the walls 132 cooperate to control the direction of the gas flow within the housing 128. In the airbag module 100 illustrated in FIG. 1, the housing 128 directs the gas from the inflator 116 through the diffuser 120 and into the airbag 112.

The walls 132 of the housing 128 further define an interior and an exterior of the housing 128. The interior of the housing 128 maintains the various components of the airbag module 100 and directs the gas flow throughout the housing 128. The exterior of the housing 128 is the ambient environment surrounding the housing 128. In many airbag applications, it is desirous for the interior of the housing 128 and the exterior of the housing 128 not to be in fluid communication. By limiting the fluid flow entirely to the interior of the housing 128, the entire amount of gas ejecting from the inflator 116 will be directed into the airbag 112.

In some applications it may not be desired for the entire amount of gas ejecting from the inflator 116 to enter the airbag 112. Rather, it may be desirable to direct only a portion of the gas ejecting from the inflator 116 into the airbag 112. Directing only a portion of the inflation gas to the airbag 112 will limit the amount of force in which the airbag 112 loads the passenger. Because the amount of gas ejected into the airbag 112 corresponds to the magnitude of force exerted by the airbag 112 on the passenger, venting selective amounts of gas away from the airbag 112 according to an impact criteria has several benefits.

In other applications, it may be desirable to vent a selective amount of inflation gas out of a fully inflated airbag 112. Such an application may allow a substantial portion of the gas within the inflator 116 to enter the airbag 112. Once the airbag 112 is fully inflated, selective venting holes 136 may be opened to allow inflation gas to exit the airbag 112. Selectively venting gas from the inflated airbag 112 allows the motion of an occupant to be dampened as the inflation gas is controllably released through the venting holes 136. By controlling the number of venting holes 136 opened, the energy management and dampening characteristics of the airbag 112 may be selected. Expulsion of inflation gas from the airbag 112 may be in part accomplished by the occupant's striking the airbag 112.

Furthermore, the inflation system may combine the two above-described applications. Selective amounts of inflation gas may be vented away from the airbag 112 during initiation, by opening selective venting holes 136. Once the airbag 112 is inflated, additional venting holes 136 may be open to released gas from the airbag 112.

The system may operate to manage the energy of an occupant's striking the airbag 112 while not wearing a seatbelt. In order to control energy of a non-restrained automobile passenger, the airbag 112 must apply a generally large force on the passenger to compensate for the lack of another restraining device. Thus, a large portion of the gas ejecting from the inflator 116 would be directed into the airbag 112. Once the occupant strikes the airbag 112, the system may then selectively open venting holes 136 to lessen the occupant's impact on the airbag 112.

By controlling the amount of gas directed into the airbag 112, the force applied to the passenger by the airbag 112 can be limited to the magnitude of force necessary to protect the occupant. Thus, certain advantages may be obtained through controlling the amount of gas injected into the airbag 112.

The airbag module 100 provides a system of venting holes 136 to actively control the amount of gas flowing into and out of the airbag 112. As illustrated in FIG. 1, the venting holes 136 are openings in the housing 128 to provide a degree of fluid communication between the interior and exterior of the housing 128. The venting holes 136 are typically positioned in one or more walls 132 of the housing 128. Because the housing 128 functions to direct the gas flow from the inflator 116 to the airbag 112, various venting holes 136 in the housing 128 will divert selective amounts of gas away from the airbag 112 during inflation or under occupant loading.

In order to control inflation gas venting out of the venting holes 136, the venting holes 136 are configured to have an opened state and a sealed state. In the sealed state, the venting holes 136 are covered with a generally thin membrane 140. The thin membrane 140 prevents fluid communication between the interior and exterior of the housing 128. Because the membrane 140 is a generally thin material, various devices may be implemented to open a selective number of venting holes 136 to control the gas flow into or out of the airbag 112.

As illustrated in FIG. 1, the housing 128 may comprise a number of venting holes 136. The number of venting holes 136 present in an airbag module 100 will correspond to the controllability of the gas flow ejecting into or out of the airbag 112. By providing multiple venting holes 136, a wide range of gas amounts may be vented out of the housing 128. For example, a housing 128 having four venting holes 136 may selectively open one, two, three, or four of the venting holes 136.

During deployment, if only one venting hole 136 is opened, a larger amount of gas will enter the airbag 112 than if four venting holes 136 were opened. Similarly, opening two or three of the venting holes 136 will decrease the amount of gas ejected to the airbag 112. Thus, an airbag module 100 having four similarly sized venting holes 136 may be configured to deploy an airbag 112 at five different deployment force magnitudes.

Similarly, a varying number of venting holes 136 may be opened after the airbag 112 inflates. A single venting hole 136 may be opened to release a generally small amount of inflation gas from the airbag 112, allowing the airbag 112 to slightly deflate under the occupant loading. Alternatively, multiple venting holes 136 may be opened after the airbag 112 inflates, allowing a larger deflation of the airbag 112 under occupant loading.

Figure 2:
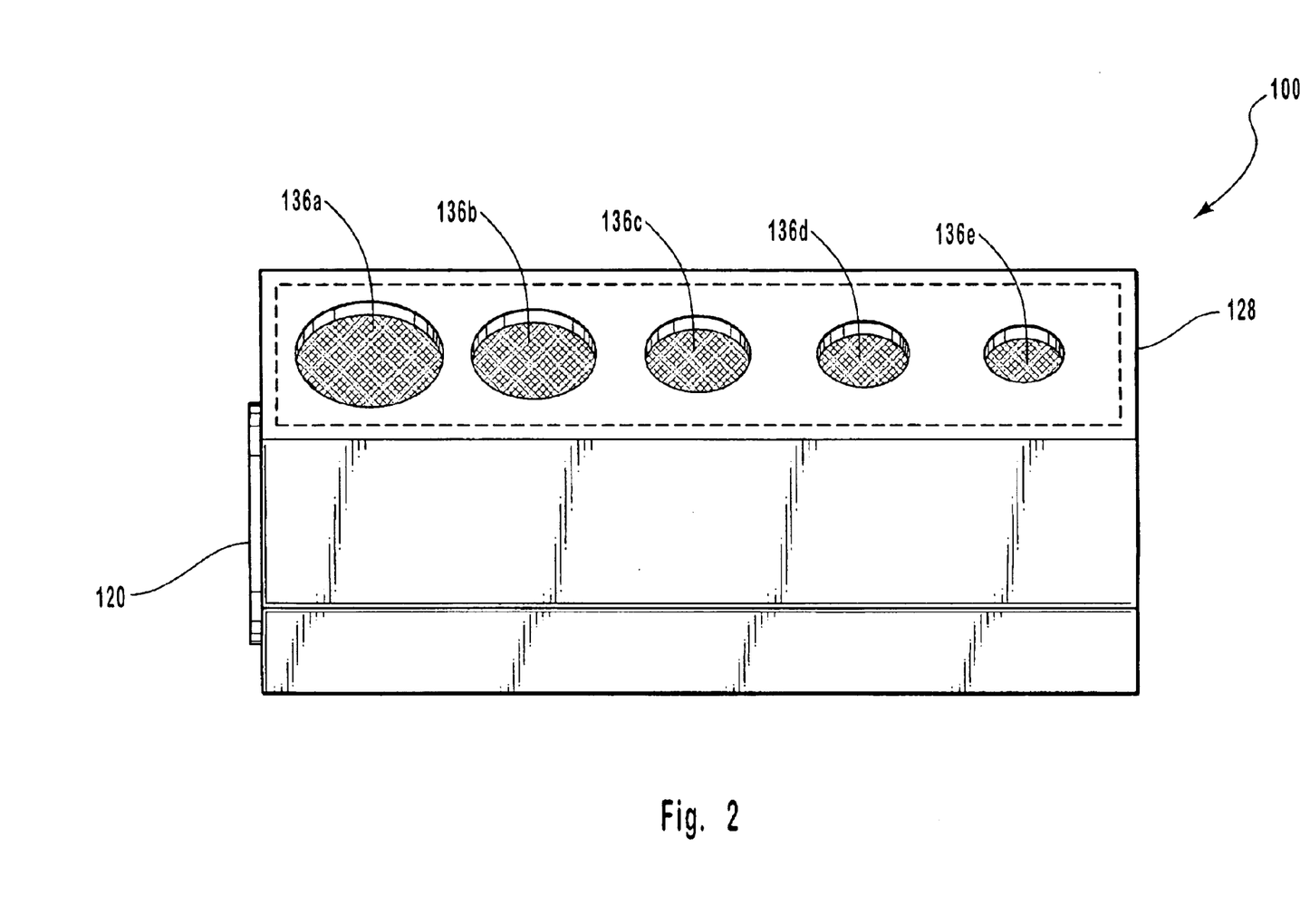
FIG. 2 is a side view of an airbag module having differently sized holes.

Additionally, the venting holes 136 do not need to be the same size or the same shape. Referring now to FIG. 2, a side view of an airbag module 100 is illustrated having multiple differently sized venting holes 136a, 136b, 136c, 136d, 136e. Generally, the cross-sectional area of the venting hole 136a, 136b, 136c, 136d, 136e will determine the amount of gas ejected from the hole 136a, 136b, 136c, 136d, 136e. The housing 128 could thus open different combinations of venting holes 136a, 136b, 136c, 136d, 136e to provide a precise flow of gas into the airbag (not shown).

For example, the housing 128 may have five venting holes 136a, 136b, 136c, 136d, 136e each having a different size. In a deployment scenario, the first venting hole 136a, the third venting hole 136c, and the fifth venting hole 136e may open to provide a first amount of gas flow into or out of the airbag. The total gas flow out of the housing 128 will be related to the sum of the cross-sectional areas of the three differently sized venting holes 136a, 136c, 136e.

Yet in a different deployment scenario, the first venting hole 136a, the second venting hole 136b, and the third venting hole 136c may open to allow a second amount of gas to flow into or out of the airbag. If the sum of the cross-sectional areas of the first venting hole 136a, third venting hole 136c, and fifth venting hole 136 is different than the sum of the cross-sectional areas of the first venting hole 136a, the second venting hole 136b, and the third venting hole 136c, then the two group of venting holes 136a, 136b, 136c, 136e will enable the airbag to receive and retain different amounts of gas. Thus, even though in both scenarios three venting holes 136a, 136b, 136c, 136e are open, the cumulative cross-sectional area of the two sets of venting holes 136a, 136b, 136c, 136e will be different.

This is in contrast to the housing 128 having multiple venting holes 136 that are each the same size, as illustrated in FIG. 1. In such a housing 128, only the number of venting holes 136 that are open, determines the flow rate of gas into or out of the airbag 112. If the first, third, and fifth venting holes 136 are open, the cumulative cross-sectional area of the venting holes 136 would be the same as if the first, second, and third venting holes 136 were open. Thus, employing multiple venting holes 136 of varying sizes will provide for a large range of control for gas ejecting into an airbag 112.

Furthermore, the venting holes 136 do not need to be circular, as illustrated in FIG. 1 and FIG. 2. The venting holes 136 may be any shape to control the cross-sectional are of the venting holes 136 in the housing 128. Additionally, the venting holes 136 may have various shapes to allow control venting of gas from the housing 128 at desired locations.

Figure 3A:
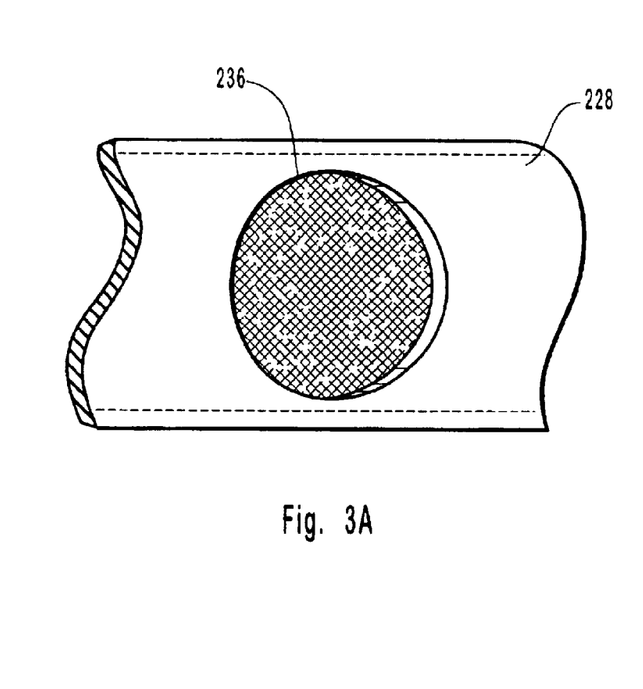
FIG. 3A is a side view of a venting hole sealed by a membrane.

Another aspect of the controllability of the housing 128 is the ability to provide a low signal energy system for opening the venting holes 136. Referring now to FIGS. 3A–D, a side view of a venting hole 236 is illustrated. FIG. 3A illustrates a venting hole 236 in a wall of the housing 228. The venting hole 236 may be generally circular or have various other shapes depending upon venting characteristics and position on the housing 228.

The venting hole 236 is simply a hole in a wall of the housing 228 that provides fluid communication between the interior and exterior of the housing 228. The venting holes 236 may be created during the manufacture of the housing 228. For example, the housing 228 may be made in an injection molding process, during which the venting holes 236 may be manufactured into a wall of the housing 228. Alternatively, the venting holes 236 may be added to the housing 228 after the housing 228 is manufactured. This may be accomplished through a simple drilling or boring process.

Figure 3B:
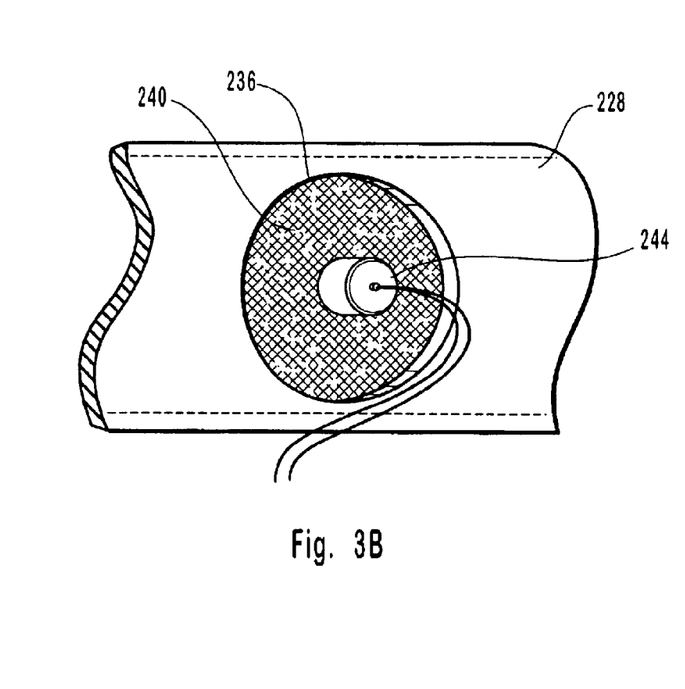
FIG. 3B is a side view of a venting hole having an initiator attached to the membrane.

Referring now to FIG. 3B, the venting hole 236 is illustrated in a sealed state. This is accomplished by applying a membrane 240 over the venting hole 236. The membrane 240 may simply be a thin piece of material covering the venting hole 236. The membrane 240 may be affixed to an interior or exterior surface of the housing 228 in order to seal the venting hole 236.

The size of the membrane 240 may be such that it covers multiple venting holes 236 of a single housing 228. This may be accomplished by providing the membrane 240 on a continuously fed role or precut elongated strip. Alternatively, single pieces of membrane 240 material may be applied over individual venting holes 236. However, applying a single piece of membrane 240 to cover multiple venting holes 236 may provide added strength advantages. A larger single piece of membrane 240 material would provide for a larger contact surface in which to affix the membrane 240 to the wall of the housing 228. The added contact area would provide a more secure attachment of the membrane 240.

The membrane 240 may be comprised of various materials. In one application, the membranes 240 may be a metallic, foil type material. Other applications may employ a plastic membrane 240. The plastic membrane 240 may be affixed to the housing 228 in various ways. For example, a thin plastic membrane 240 may be integrally molded into the housing 228. The membrane 240 would simply be a section of reduced thickness in the wall of the housing 228 surrounded by a substantially thicker perimeter defining the venting hole 236.

Alternatively, the membrane 240 may be a type of plastic insert that is placed within a pre-established venting hole 236 in the housing 228. The plastic insert could have a section that comprises a thin membrane 240 as well as a flanged section that allows the insert to sit within a venting hole 236 in the housing 228. The flange section could but up against the internal walls of the housing 228 and the membrane 240 of the plastic insert would span across the venting hole 236. Then, the edges of the plastic insert could be sealed around the housing 228.

The thickness of the membrane 240 will depend upon the material used. In one embodiment, an aluminum foil having a thickness range of about 0.004 inches to about 0.007 inches may be used. Other applications of the same aluminum foil may have thicknesses less than about 0.004 inches. Various other materials will have other thicknesses depending upon the material properties, size of the venting hole 236, and the gas pressure within the housing 228.

A wide range of materials may be used as a membrane 240 for scaling the venting holes 236 of the housing 228. Generally, any material that is capable of sealing the venting holes 236 while supporting a large pressure differential may be implemented as a membrane 240. The membrane 240 material must also be strong enough and fixed tightly enough to the housing 228 to remain sealed during deployment of the airbag 112.

In the airbag module 100 disclosed herein, the inflation gas travels through the housing 228 before entering the airbag 112. The same high pressure that exists within the airbag 112 is also present in the housing 228. Therefore, the strength of the membrane 240 material must be sufficient to withstand this high pressure, yet still be capable of controllably opening the venting holes 236 in response to an initiation signal.

The membrane 240 that is sealing the venting holes 236 is open through the use of an initiator 244. The initiator 244 is a device capable of producing a hole within the membrane 240. The initiator 244 may be an electrochemical, pyrotechnic, deflagration, or other such similar device. The initiator 244 is located at a position adjacent to or directly attached to the membrane 240. Directly attaching the initiator 244 to the membrane 240 allows the effects of the initiator 244, such as in a pyrotechnic charge, to be easily transferred to the membrane 240. Furthermore, directly attaching the initiator 244 to the membrane 240 may provide a convenient attachment platform.

However, the initiator 244 does not necessarily need to be directly attached to the membrane 240. The initiator 244 may be positioned at a distance from the membrane 240. The position of the initiator 244 will be dictated by its ability to open the membrane 240. For example, a deflagration initiator 244 would likely be positioned directly on or in close proximity to the membrane 240 in order to burn a hole in the membrane 240. Alternatively, a pyrotechnic initiator 244 may be capable of projecting a force sufficient to open the membrane 240 from a distance further from the membrane 240. Therefore, the position of the initiator 244 will depend upon the type of initiator 244 employed in opening the membrane 240.

The initiator 244 may be operated through a wire 248 coupled to the initiator 244. In some applications, the wire 248 may send an electrical signal to the initiator 244 that initiates a chemical reaction where the resulting reaction opens a hole in the membrane 240. Other applications may employ a wire 248 conducting a large current to burn a hole in the membrane 240. The initiator wire 248 may use various control devices and systems to initiate the opening of the membrane 240.

Figure 4A:
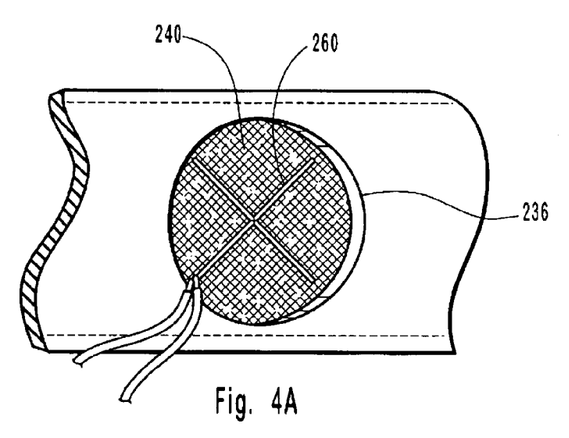
FIG. 4A is a side view of a venting hole with an X-shaped initiator.

The initiator 244 may also have varying shapes for the different initiation methods. The initiator 244 shape may include an X-shaped initiator 260 for creating an X-shaped cut in the membrane 240, as illustrated in FIG. 4A. The X-shaped inflator 260 would substantially open the venting hole 236. The X-shaped initiator 260 may be a deflagration strip or a pyrotechnic.

Figure 4B:
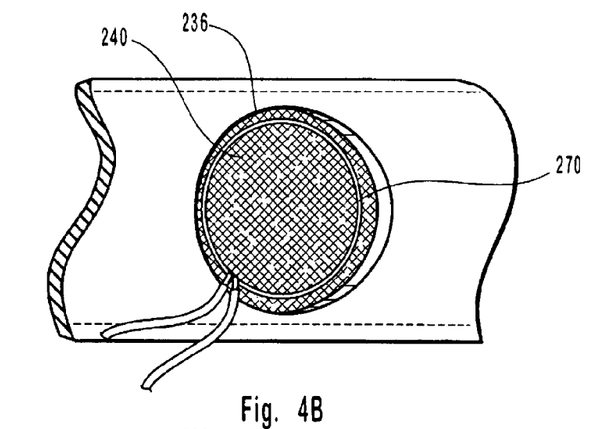
FIG. 4B is a side view of a venting hole with a circular initiator.

A circular initiator 270 may also be used on the membrane 240, as illustrated in FIG. 4B. A circular initiator 270 could be a deflagration device that separates the center section of the membrane 240 from the perimeter of the membrane 240, creating a large opening in the membrane 240.

Figure 4C:
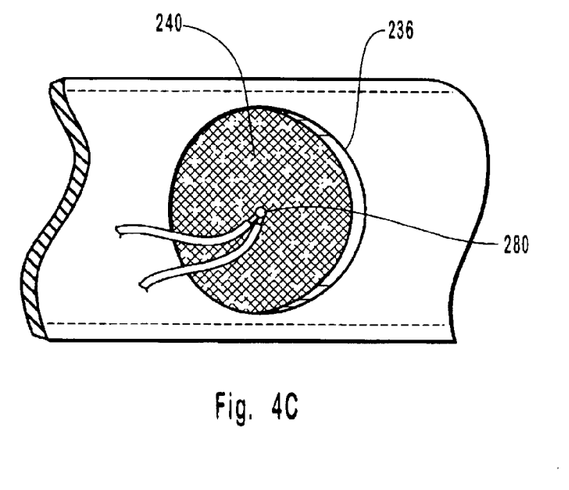
FIG. 4C is a side view of a venting hole with a point initiator.

Alternatively, a point charge initiator 280 may be implemented, as illustrated in FIG. 4C. A point charge initiator 280 is configured to create a comparatively small hole in the membrane 240 compared to the overall size of the venting hole 236. The point charge initiator 280 may be a pyrotechnic or a mechanical mechanism to puncture the membrane 240.

Figure 4D:
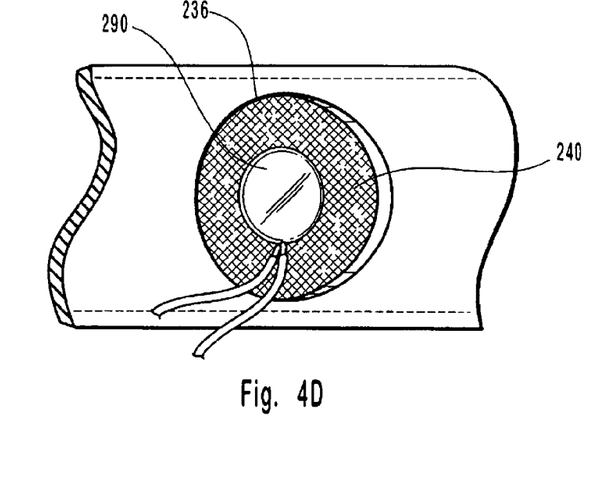
FIG. 4D is a side view of a venting hole with a surface material initiator.

Referring to FIG. 4D, in another embodiment a surface material initiator 290 may be used to open the membrane 240. The surface material initiator 290 may be a layer of pyrotechnic or deflagration material that is adhered to or formed into the membrane 240. The surface material initiator 290 may further provide structural support for the membrane 240 when not open.

While, some embodiments of various initiators are discussed above, one having skill in the art will recognize that various other initiators may be used in the present invention.

Figure 3C:
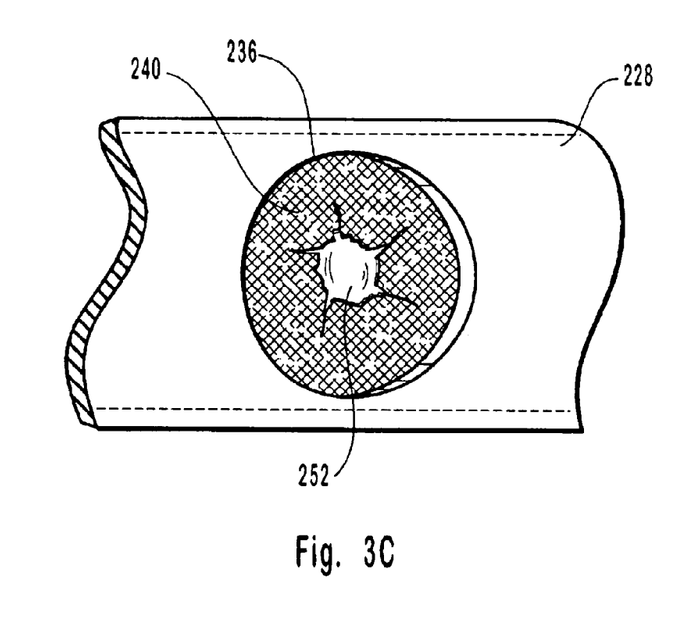
FIG. 3C is a side view of a venting hole having a propagation hole in the membrane.

Referring now to FIG. 3C, a venting hole 236 is illustrated having a membrane 240 with an initiator 244 induced hole 252. The hole 252 is of the type that may be created by a point charge. The point charge is simply any initiator 244 that creates a generally small hole in the membrane 240. Such a hole that is substantially smaller than the membrane 240 is referred to herein as a propagation hole 252.

A propagation hole 252 is a hole that provides a starting location for the membrane 240 to tear open. One advantage of using a membrane 240 to seal a venting hole 236 is the ability for a small propagation hole 252 in the membrane 240 to propagate into a completely open venting hole 236. Generating a small propagation hole 252 requires less energy to open the membrane 240 than would be required in creating a larger hole to completely open the membrane 240 at a single instant.

The propagation hole 252 functions to open the venting hole 236 in cooperation with the pressure of the gas ejected from the inflator 116 or from the pressure produced in the airbag 112 under occupant loading. Once the propagation hole 252 is created, the high pressure within the housing 228 is forced out through the propagation hole 252. The force created by the high pressure gas passing through the propagation hole 252 further opens the propagation hole 252 until the venting hole 236 is completely opened. Typically, when the inflator 116 initiates, it creates a large pressure differential between the interior and the exterior of the housing 228. As the high pressure gas seeks a low pressure environment, the high pressure gas will begin to force itself into the airbag 112. Simultaneously, the high pressure gas inside the housing 228 will apply a force on the membrane 240.

While the high pressure gas is applying an outward force on the membrane 240, the initiator 244 creates a propagation hole 252 in the membrane 240. Because of the presence of the propagation hole 252, the internal stresses within the membrane 240 become unbalanced around the propagation hole 252. As the high pressure gas forces through the propagation hole 252, the edges of the hole 252 began to tear, starting at the propagation holes 252 and tearing outward toward the edges of the venting hole 236.

Figure 3D:
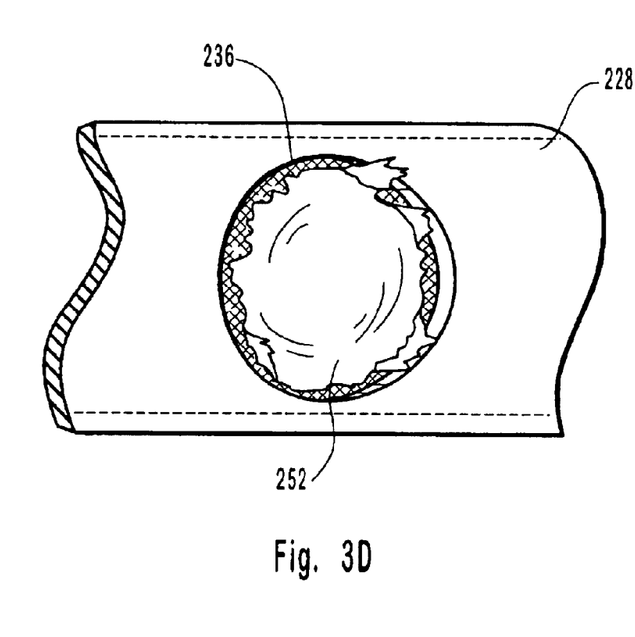
FIG. 3D is a side view of an open venting hole.

The tearing is induced by the high pressure gas applying a force on the remaining portions of the membrane 240. Thus, the initiator 244 need only create a small starter or propagation hole 252 in the membrane 240. Then the internal gas pressure of the housing 228 forces the rest of the membrane 240 open, as illustrated in FIG. 3D. Opening the venting hole 236 by tearing open the membrane 240 is a one time, destructive opening, where the device sealing the venting hole 236 is destroyed.

Once the membrane 240 is destroyed, the interior and exterior of the housing 228 are placed in fluid communication. The fluid communication allows a portion of the gas, corresponding to the size and numbers of venting holes 236, to be vented away from the airbag 112.

Other embodiments of the airbag module 100 may employ an initiator 244 that opens the entire venting hole 236 at a single instant, without the use of a propagation hole 252. This may entail a larger initiator 244 in order to destroy a larger area of the membrane 240. Additionally, the initiator 244 may be positioned around the perimeter of the membrane 240. When the initiator 244 initiates, the edges of the membrane 240 will be severed and the center portion of the membrane 240 will be ejected out of the venting hole 236. However, such an embodiment will likely require a larger amount of energy as well as a larger initiator 244. While this may be acceptable in some applications, generally it is preferable to limit the overall cost of the airbag module 100.

The present active venting system requires a smaller storage area than conventional modules with venting feature. Because the membrane 240 is a thin material that covers the venting holes 236, the lack of complex mechanical components allows the airbag module 100 to occupy a small storage area. Furthermore, because the venting hole 236 is opened by creating a small propagation hole 252 in the membrane 240, the initiator 244 may also be relatively small.

Furthermore, the inflation system may combine the two above-described applications. Selective amounts of inflation gas may be vented away from the airbag 112 during initiation, by opening selective venting holes 136. Once the airbag 112 is inflated, additional venting holes 136 may be open to released gas from the airbag 112.

The active venting system also provides an easily controllable venting method. As discussed above, venting is accomplished through a series of venting holes 236 in the housing 228. The venting holes 236 may be various sizes and shapes depending upon the venting application. Because the venting holes 236 are pre-established shapes that are opened as the membrane 240 covering the venting hole 236 is destroyed, the shape and flow area of the venting hole 236 may be easily calculated and controlled.

Figure 5:
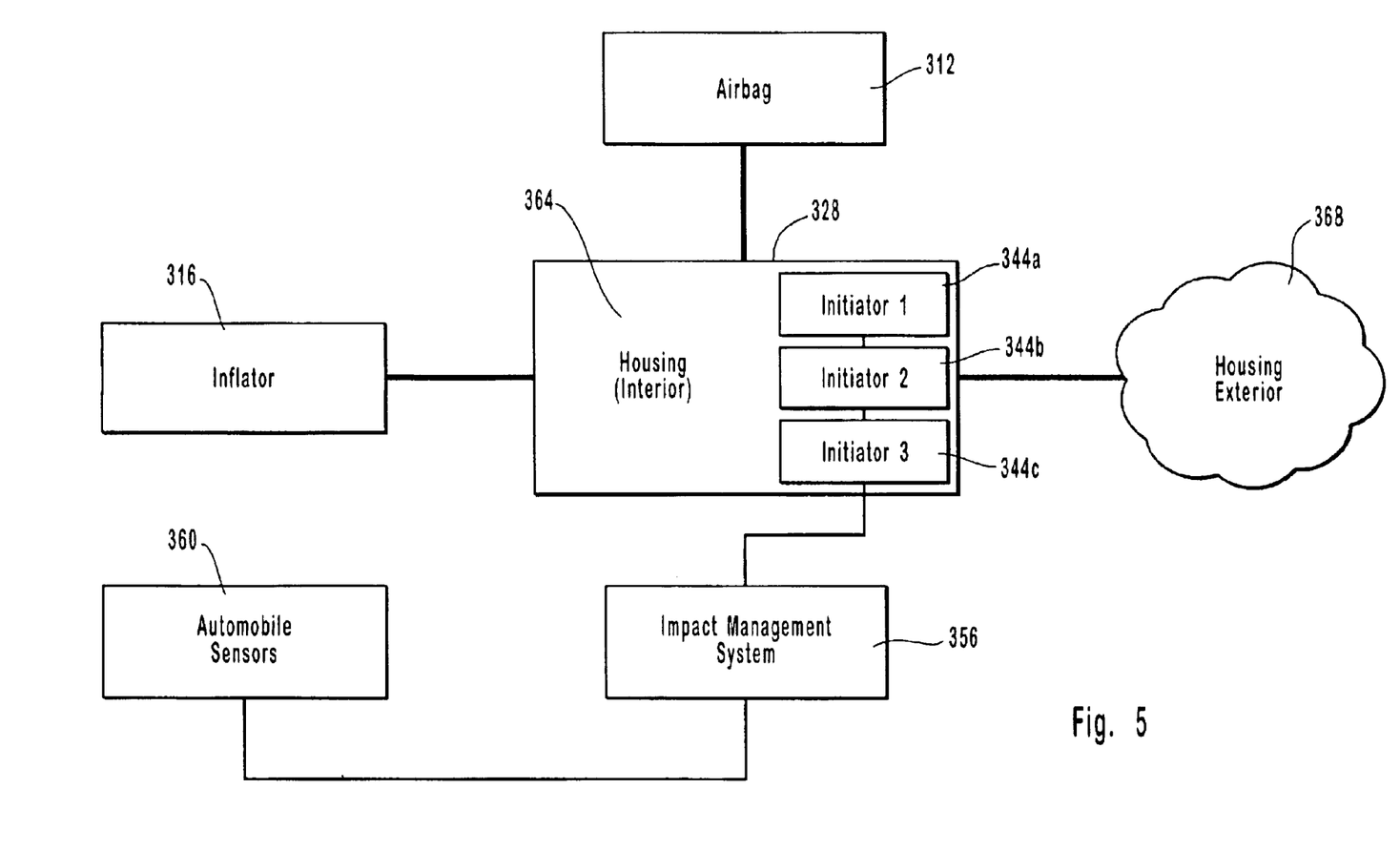
FIG. 5 is a block diagram of an airbag module system.

Referring now to FIG. 5, a system is illustrated for controlling active venting of the housing 328. The present system illustrates the flow of the inflation gas and signal control of the initiators 344a, 344b, 344c. The housing 328 is in fluid communication with the airbag 312 and the inflator 316. The housing 328 receives a gas input from the inflator 316 when the inflator 316 initiates. The gas is received into the interior of the housing 328 and is then directed into the airbag 312. In this configuration, all of the gas ejected from the inflator 316 is directed into and remains in the airbag 312.

However, for reasons discussed above it may be desirous to direct an amount of gas from the inflator 316 away from the airbag 312 or from the airbag 312 under occupant loading. In order to control the amount of gas directed away from the airbag 312, the housing 328 has a plurality of initiators 344. FIG. 5 illustrates three initiators 344a, 344b, 344c for illustrative purposes. Each initiator 344a, 344b, 344c is associated with a single venting hole (not illustrated) sealed by a membrane (not illustrated). Thus, the system in FIG. 5 illustrates a housing 328 that would have three venting holes.

Each of the initiators 344a, 344b, 344c is capable of opening a venting hole in the housing 328. The control of the initiation of the initiators 344a, 344b, 344c is maintained by the impact management system (IMS) 356. The IMS 356 is communicatively coupled to the initiators 344a, 344b, 344c. An IMS 356 provides a signal to the individual initiators 344a, 344b, 344c to initiate and open an individual venting hole.

Determining which venting hole to open is in part established from input received from a plurality of automobile sensors 360. The automobile sensors 360 may be any number of sensing devices positioned within an automobile to identify the severity of an impact and characteristics of the automobile passengers. For example, the automobile sensors 360 may include seat sensors to determine the weight, position, and other pertinent information of the individual automobile passengers. Other sensors 360 may detect whether a seatbelt is fastened or not. Yet other sensors 360 may optically scan the automobile passenger's movements.

Regardless of the sensor configuration in the automobile, the information from the sensors 360 is received by the IMS 356. The IMS 356 is configured to process the information received by the automobile sensors 360 and determine the proper deployment scenario for the airbag 312. The deployment scenario will determine the degree of inflation or deflation required in the airbag 312. Once the degree of inflation or deflation is determined by the IMS 356, the IMS 356 will determine which venting holes should or should not be opened.

In general, if a high degree of initial inflation is required in the airbag 312, then few or none of the initiators 344a, 344b, 344c will be signaled to open a venting hole. Alternatively, if the IMS 356 determines that a low degree of initial inflation is required in the airbag 312, then multiple initiators 344a, 344b, 344c will be signaled to open multiple venting holes.

Similarly, the IMS 356 will also control deflation of the airbag 312 once the occupant strikes of the airbag 312. If a large amount of pressure is needed within the airbags 312, then few or none initiators 344a, 344b, 344c will open the venting holes. Alternatively, if the IMS 356 determines that the airbags 312 must deflates under the occupants loading of the airbag 312, multiple initiators 344a, 344b, 344c will open the corresponding venting holes.

Once the initiators 344a, 344b, 344c selectively open a number of the venting holes, the interior of the housing 328 becomes in fluid communication with the housing exterior 368. The housing exterior 368 may be any reservoir capable of receiving gas diverted away from the airbag 312, such as the ambient environment. As the determined amount of gas is vented to the housing exterior 368, the inflation of the airbag 312 will correspondingly decrease. Thus, the IMS 356 may control the inflation of the airbag 312 by selectively opening the venting holes by controlling the initiator 344a, 344b, 344c.

Various alternative controlling mechanisms may be possible in the present active venting system. Regardless of the controlling systems, the present apparatus provides a low cost and highly controllable series of venting holes that may be selectively opened. The venting holes are initially sealed through the use of the membrane covering the venting holes. The venting holes are further provided with initiators that destructively open the membranes that seal the venting holes. Once the membranes are opened, the interior of the housing may vent a selective amount of gas away from the airbag and out to the exterior of the housing. Thus, the inflation characteristics of the airbag may be actively controlled.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus for controllably venting gas produced by an airbag inflator comprising:

a housing having a wall defining an interior and an exterior;

a plurality of venting holes located in the housing wall;

at least one membrane sealing the venting holes, the membrane preventing fluid communication between the interior and exterior of the housing; and a plurality of initiators located at positions corresponding to the venting holes and relative to the at least one membrane, such that each initiator is activatable independent of each other to selectively produce a hole in the membrane.

2. The apparatus, as recited in claim 1, wherein the membrane is a foil.

3. The apparatus, as recited in claim 2, wherein the foil is aluminum.

4. The apparatus, as recited in claim 1, wherein the membrane thickness is of a range from about 0.004 inches to about 0.007 inches.

5. The apparatus, as recited in claim 1, wherein the membrane thickness is of a range from about 0.001 inches to about 0.004 inches.

6. The apparatus, as recited in claim 1, wherein the membrane is plastic.

7. The apparatus, as recited in claim 1, wherein the venting holes are generally circular.

8. The apparatus, as recited in claim 1, wherein the venting holes are of different sizes.

9. The apparatus, as recited in claim 1, wherein the number of initiators corresponding to the number of venting holes.

10. The apparatus, as recited in claim 1, wherein the at least one membrane is a single membrane that seals the plurality of venting holes.

11. The apparatus, as recited in claim 1, wherein the membrane is adhered to an internal surface of the housing.

12. The apparatus, as recited in claim 1, wherein the initiators are attached to the membrane.

13. The apparatus, as recited in claim 1, wherein the hole in the membrane produced by each initiator is a propagation hole.

14. The apparatus, as recited in claim 1, wherein the initiators are small point charges.

15. The apparatus, as recited in claim 1, wherein the initiators are rectangular strips.

16. The apparatus, as recited in claim 1, wherein the initiators are deflagration devices.

17. The apparatus, as recited in claim 1, wherein the initiators are electro-chemical devices.

18. The apparatus, as recited in claim 1, wherein the initiators are pyrotechnic devices.

19. The apparatus, as recited in claim 1, further comprising an impact management system communicatively coupled to the initiators.

20. An apparatus to controllably vent a gas produced by an airbag inflator comprising:
- a housing having a wall defining an interior and an exterior;
- an airbag in fluid communication with the interior of the housing;
- a plurality of venting holes located in the housing wall;
- at least one membrane attached to the housing to seal the venting holes, the membrane preventing fluid communication between the interior and exterior of the housing; and
- a plurality of initiators attached to the membrane corresponding to the number of venting holes, each initiator activatable independent of each other to selectively produce a propagation hole in the membrane.

21. The apparatus, as recited in claim 20, wherein the initiators are deflagration devices.

22. The apparatus, as recited in claim 20, wherein the initiators are electro-chemical devices.

23. The apparatus, as recited in claim 20, wherein the initiators are pyrotechnic devices.

24. The apparatus, as recited in claim 20, wherein the membrane is a foil.

25. The apparatus, as recited in claim 24, wherein the foil is aluminum.

26. The apparatus, as recited in claim 20, wherein the membrane is a plastic material.

27. The apparatus, as recited in claim 20, further comprising an impact management system communicatively coupled to the initiators.

28. The apparatus, as recited in claim 27, further comprising a plurality of sensors located within an automobile, wherein the sensors are communicatively coupled to the impact management system.

29. The apparatus, as recited in claim 20, wherein the area of the propagation hole is smaller than half of the size of each corresponding venting hole.

30. A system for controllably deploying an airbag within a vehicle comprising:
- a housing having a plurality of walls, wherein the walls define an interior and an exterior;
- a plurality of venting holes disposed in a housing wall, such that the venting holes provide fluid communication between the interior and the exterior of the housing;
- at least one membrane positioned over the venting holes for preventing fluid communication between the interior and the exterior of the housing;
- an inflator fluidly coupled to the housing;
- an airbag fluidly coupled to the housing;
- a plurality of initiators corresponding to the number of venting holes positioned, such that upon activation each initiator produces a hole in the membrane, the initiators selectively activatable independent of each other; and
- an impact management system communicatively coupled to at least one sensor positioned within the vehicle, wherein in response to an input from the at least one sensor, the impact management system initiates the initiators.

31. The system, as recited in claim 30, wherein individual venting holes are sealed by individual membranes.

32. The system, as recited in claim 30, wherein the initiators are located adjacent to the venting holes.

33. The system, as recited in claim 30, wherein the at least one sensors provides input corresponding to an automobile occupant's characteristics.

34. The system, as recited in claim 30, wherein the inflator is positioned within the housing.

35. The system, as recited in claim 30, wherein the initiators are directly attached to the membrane.

36. The system, as recited in claim 30, wherein the impact management system further initiates the inflator.

* * * * *